United States Patent [19]

Gauthier et al.

[11] 4,239,941

[45] Dec. 16, 1980

[54] RINGING SIGNAL GENERATOR

[75] Inventors: John A. Gauthier; David M. Shaver; John R. Ramsay, all of Brockville, Canada

[73] Assignee: GTE Automatic Electric Laboratories Incorporated, Northlake, Ill.

[21] Appl. No.: 16,672

[22] Filed: Mar. 1, 1979

[51] Int. Cl.³ .............................................. H04M 1/26
[52] U.S. Cl. .................................. 179/84 R; 328/27; 340/347 AD; 179/2 A
[58] Field of Search .................. 179/2 R, 2 A, 84 R, 179/17 E, 18 HB, 84 SS; 328/14, 27; 307/261; 340/347 M, 347 AD, 347 DA; 331/60

[56] References Cited

U.S. PATENT DOCUMENTS 3,657,657  4/1972  Jefferson .................................. 328/27
4,025,868  5/1977  Miki et al. ........................... 340/347 AD Primary Examiner—Raymond F. Cardillo, Jr.
Assistant Examiner—Joseph A. Popek
Attorney, Agent, or Firm—Robert J. Black; Gregory G. Hendricks

[57] ABSTRACT

A telephone ringing signal generator which produces a signal that can ring a plurality of connected ringers tuned to different frequencies. The ringing signal comprises sequentially varying frequencies and each ringer will ring in response to its particular frequency. A counter is used to define the duration of the ringing signal and enable each frequency sequentially. A variable sweep frequency oscillator is connected to the counter and generates a signal having a different frequency for each counter increment. A programmable filter shapes the signal into a sine wave which is amplified to ringing voltage levels by a ringing signal amplifier.

10 Claims, 1 Drawing Figure

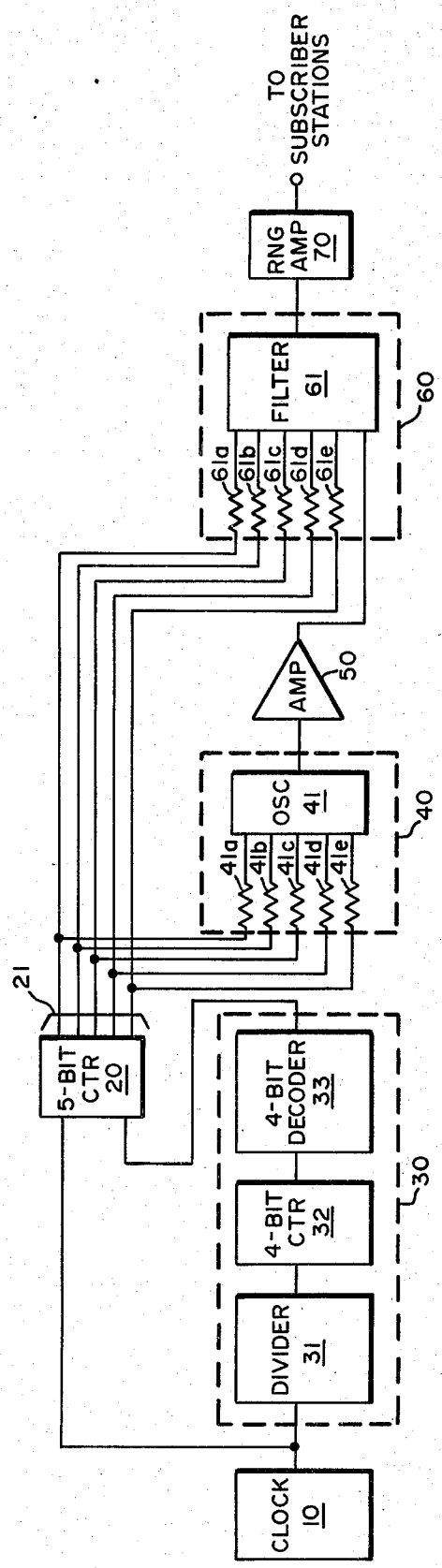

RINGING SIGNAL GENERATOR

BACKGROUND OF THE INVENTION

(1) Field of the Invention

The present invention relates to telephone system ringing systems and more particularly to a ringing signal generator capable of a plurality of ringing telephone substations each responsive to at least one of a plurality of different ringing signal frequencies.

(2) Description of the Prior Art

Some telephone system stations often include telephones which respond to different ringing frequencies. Therefore, in order to ring a selected telephone, the control system must apply a ringing signal of a frequency to which the particular telephone will respond.

Various methods have been employed to ring tuned ringers of different frequencies from one ringing supply. One approach is to use selective strapping arrangements to connect the ringing signal of the required frequency only to those telephone substations tuned to that particular frequency. A more modern approach is to use a data base that determines the ringing frequency necessary for each subscriber. This method involves storing the subscriber ringing frequency data, recalling it every time the subscriber's telephone is to be rung, and programming a programmable ringing generator. This data frequently must be changed when changes in the substation telephone are made.

These prior art methods incur substantial penalties in the form of cost, size and/or limitations on performance.

Accordingly it is an object of the present invention to provide a novel, low cost, reliable technique of ringing tuned ringers.

SUMMARY OF THE INVENTION

The present invention is designed to ring telephones employed in a door entry control system where the same telephones are connected to a telephone central office. In such entry systems the subscriber can converse with others via the telephone central office or with a potential visitor in the foyer via the door entry control system and by dialing a code digit into the control system, unlock the entrance door. The control system connects in series with the subscriber's central office line and is capable of ringing any telephone connected to it, whether the telephone has a tuned ringer, a straight line ringer or an electronic ringer. To allow the subscriber to distinguish between a call from the central office and one from the door entry control system, the latter applies two short bursts of ringing followed by a pause.

The circuit consists of a system clock connected to a five-bit binary counter and to a timing circuit including a divide-by-ten counter, a four-bit counter and a four-bit decoder which is also connected to the five-bit counter. The five bit counter is further connected to a sweep frequency oscillator and a programmable filter. A current amplifier is connected between the sweep frequency oscillator and the programmable filter which is further connected to a ringing signal amplifier which transmits the resultant ringing signal to a plurality of telephone substations.

Tuned ringers typically respond to the following frequencies: 16, 20, 25, 30, 33, 40, 42, 50, 51, 54, 60 and 66 Hz. A straight line ringer responds to approximately 20 Hz with a wide bandpass and an electronic ringer will respond to any of these frequencies.

In order to ring telephones which respond to these frequencies, the ringing generator (which is the subject of this disclosure) scans from 12 to 80 Hz for each burst of ringing current. This allows each ringer to respond to that frequency within its own particular range.

The five-bit counter controls the duration of each burst of ringing signal while the sweep frequency oscillator scans from 12 to 80 Hz. This ringing signal is then filtered and amplified to ringing voltage level before being transmitted to telephone substations. The timing circuit including the divide-by-ten counter, four-bit counter and four-bit decoder provide overall ringing cycle timing.

DESCRIPTION OF THE DRAWINGS

The single FIGURE of the accompanying drawing is a block diagram of a ringing signal generator in accordance with the present invention.

DESCRIPTION OF THE PREFERRED EMBODIMENT

Referring now to the accompanying drawing, the ringing signal generator of the present invention is shown. The clock circuit, divider, counters, decoder, oscillator, filter and amplifiers are old and well known. Commercially available integrated circuits may be readily used by those skilled in the art to implement these elements.

The ringing signal generator of the present invention is associated with a door entry control system which connects an associated telephone substation to the ringing signal generator in order to signal the subscriber that he has a potential visitor. The ringing signal generator is operated to generate two 1.28 second bursts of ringing current separated by a 0.32 second pause and followed by a 3.52 second pause. Each burst of ringing current is generated by the sweep frequency oscillator 41 which sweeps from 12 Hz to 80 Hz in 2.1 Hz increments. Consequently each telephone substation responds during the presence of signals within its passband to produce 2 short burst of ringing tone followed by a pause.

The system clock circuit 10 is connected to a five-bit binary counter 20 and to a timing circuit including divide-by-ten counter 31, four-bit decoder 33, and four-bit counter 32 connected between counter 31 and four-bit decoder 33. Decoder 33 is connected to the start lead of five-bit counter 20. The output leads 21 of five-bit counter 20 are connected to sweep frequency oscillator 40 and programmable filter 60. Sweep frequency oscillator 40 is connected to programmable filter 43 via current amplifier 50. Programmable filter 60 is then connected to ringing signal amplifier 70 which is connectable to the telephone substations of the system.

System clock circuit 10 generates a continuous pulsing signal having a 40 millisecond period. Divide-by-ten counter 31 responds to this 40 millisecond signal by generating a second continuous pulsing signal having a 400 millisecond period. Four-bit counter 32 responds to this 400 millisecond signal by counting from 1 to 16, thus providing a 6.4 second (400 millisecond × 16) overall timing period.

Four-bit decoder 33 on decoding a count of zero, generates a first start signal, and on a count of four, generates a second start signal after 1.6 seconds (400 millisecond × 4) have elapsed.

Five-bit counter 20 starts counting the 40 millisecond pulses from system clock 10 upon receiving the first start signal, at the count of zero, from four-bit decoder 33. Five-bit counter 20 counts from 1 to 32 and consequently will count for a duration of 1.28 seconds (32×40 millisecond) at which time it will reset. Five-bit counter 20 will again count from 1 to 32 for another 1.28 seconds upon receipt of a second start signal from four-bit decoder 33 which is received after a duration of 1.6 seconds has elapsed. Therefore there will be a 0.32 second (1.6 second −1.28 second) pause between the first and second five-bit counter cycles. Also, since the five-bit counter 20 will not start counting again until it receives another start signal which occurs at the end of the four-bit counter's cycle (count of zero) there will be a 3.52 second (6.4 second −1.28 second−1.28 second−0.32 second) pause after the second five-bit counter cycle.

Sweep frequency oscillator 40 has its five input leads connected to the five output leads 21 of five-bit counter 20. Each input lead includes a different resistor, 41a–e, so that for each input lead associated with an active five-bit counter output signal, a different frequency is generated by oscillator 41. Since five-bit counter 20 generates 32 different counter values, sweep frequency oscillator 40 generates 32 different frequencies.

The range of frequencies of oscillator 40 is 12 Hz to 80 Hz, so for each increment of counter 20 there will be a 2.1 Hz=(80−12)÷32 frequency change.

The sweep frequency signal generated by sweep frequency oscillator 40 is then amplified by current amplifier 50.

Programmable filter 60 is also connected to five-bit counter 20 in a manner similar to that of sweep frequency oscillator 40. For each counter value of counter 20 a different resistor, 61a–e, connected to filter 61. Filter 61 is enabled resulting in a 32 different filter circuits corresponding to the 32 different frequencies generated by sweep frequency oscillator 40. Programmable filter 60 filters the triangular shaped sweep frequency signal from current amplifier 50 into a sinusoidal signal. This sinusoidal sweep frequency signal is then amplified to ringing voltage level by ringing signal amplifier 70.

The ringing signal generator of the present invention thus provides two short bursts of ringing signal followed by a pause in order to distinguish it from a central office ringing signal. Also, each burst of ringing signal has a sweep frequency such that any tuned ringer connected to it will respond during its passband.

It will be obvious to those skilled in the art that numerous modifications of the present invention can be made without departing from the spirit of the invention which shall be limited only by the scope of the claims appended hereto.

What is claimed is:

1. A ringing signal generator for use in a telephone communication system connectable to a plurality of telephone substations including at least a first substation responsive to a first ringing signal frequency and a second substation responsive to a second ringing signal frequency, said ringing signal generator comprising:

clock means operated to generate a plurality of periodic clock pulses;

timing means connected to said clock means, periodically operated in response to a first predetermined number of said clock pulses to generate a first timing signal;

counting means connected to said clock means and to said timing means operated in response to said first timing signal to count said clock pulses and generate a plurality of sequential enabling signals, each associated with a different count of said counting means; and variable frequency signaling means connected to said counting means, operated in response to said sequential enabling signals to generate a ringing signal comprising a plurality of different frequencies, each associated with a different one of said enabling signals, for sequential transmission to said plurality of telephone substations.

2. A ringing signal generator as claimed in claim 1, wherein: said timing means is periodically operated in response to a second predetermined number of said clock pulses to generate a second timing signal; and said counting means further operated in response to said second timing signal to count said clock pulses and generate said plurality of sequential enabling signals.

3. A ringing signal generator as claimed in claim 2, wherein: said counting means resets upon reaching a predetermined count.

4. A ringing signal generator as claimed in claim 1, wherein: said clock means generates regularly recurring sequential pulses having a predetermined period.

5. A ringing signal generator as claimed in claim 1, wherein: said counting means comprise a five-bit binary counter.

6. A ringing signal generator as claimed in claim 1, wherein: said timing means comprise a four-bit counter connected between a divide-by-ten counter connected to said clock and a four-bit decoder connected to said counting means.

7. A ringing signal generator as claimed in claim 1, wherein: said variable frequency signaling means includes a sweep frequency oscillator connected to said counting means operated in response to said plurality of enabling signals to generate a ringing signal comprising a plurality of frequencies.

8. A ringing signal generator as claimed in claim 7, wherein: said variable frequency signaling means further includes a first amplifier connected to said sweep frequency osciallator operated to amplify said ringing signal.

9. A ringing signal generator as claimed in claim 8, wherein: said variable frequency signaling means further includes a programmable filter connected to said counting means and to said first amplifier, operated in response to said enabling signals and to said amplified ringing signal to selectively filter said ringing signal.

10. A ringing signal generator as claimed in claim 9, wherein: said variable frequency signaling means further includes a second amplifier connectable to said plurality of substations and connected to said programmable filter operated in response to said amplified and filtered signal to further amplify said ringing signal for transmission to said plurality of telephone substations.

* * * * *